US012302059B2

(12) United States Patent
Takahashi

(10) Patent No.: US 12,302,059 B2
(45) Date of Patent: May 13, 2025

(54) MEASUREMENT SYSTEM AND MEASUREMENT METHOD

(71) Applicant: PANASONIC INTELLECTUAL PROPERTY MANAGEMENT CO., LTD., Osaka (JP)

(72) Inventor: Takeshi Takahashi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 228 days.

(21) Appl. No.: 17/949,017

(22) Filed: Sep. 20, 2022

(65) Prior Publication Data

US 2023/0224629 A1 Jul. 13, 2023

(30) Foreign Application Priority Data

Jan. 12, 2022 (JP) ................................ 2022-003369

(51) Int. Cl.

*H04R 1/28* (2006.01)
*H04R 3/00* (2006.01)
*H04R 29/00* (2006.01)

(52) U.S. Cl.

CPC ............... *H04R 1/28* (2013.01); *H04R 3/005* (2013.01); *H04R 29/00* (2013.01); *H04R 2499/10* (2013.01)

(58) Field of Classification Search

CPC .......... H04R 1/28; H04R 3/005; H04R 29/00; H04R 2499/10; H04R 1/1041; H04R 29/001; H04R 1/10; H04R 1/1025; H04R 5/033; H04R 2460/00–2460/17
USPC .................... 381/309, 325, 328, 58, 74, 380
See application file for complete search history.

(56) References Cited

U.S. PATENT DOCUMENTS

| | | | | |
|---|---|---|---|---|
| 8,917,876 | B2 * | 12/2014 | Goldstein | H04R 3/007 345/82 |
| 10,293,158 | B2 | 5/2019 | Goodall et al. | |
| 10,748,521 | B1 * | 8/2020 | Mulvey | G10K 11/17817 |
| 2016/0321420 | A1 * | 11/2016 | Klee | H04W 4/80 |
| 2021/0014613 | A1 * | 1/2021 | Carrigan | H04R 1/1016 |
| 2022/0150617 | A1 * | 5/2022 | Backe | A61L 2/26 |

FOREIGN PATENT DOCUMENTS

| | | | |
|---|---|---|---|
| CN | 109068205 | A | 12/2018 |
| CN | 212163710 | U | 12/2020 |
| WO | WO 2022004787 | A1 | 1/2022 |

OTHER PUBLICATIONS

Extended European Search Report, dated Jun. 6, 2023, for European Patent Application No. 22195860.6-1210. (5 pages).

* cited by examiner

*Primary Examiner* — Xu Mei
(74) *Attorney, Agent, or Firm* — Seed IP Law Group LLP

(57) ABSTRACT

A measurement system includes earphones configured to be worn on left and right ears of a user respectively and a wireless terminal. The earphones measure and accumulate usage time during the earphones are used by a user, and transmit accumulated usage time to the wireless terminal. The wireless terminal acquires the accumulated usage time from the earphones, determines whether the accumulated usage time exceeds predetermined time, and generates a notification for urging the user to clean the earphones when it is determined that the accumulated usage time exceeds the predetermined time.

11 Claims, 11 Drawing Sheets

FIG. 8

| | EXAMPLE OF NOTIFICATION SOUND |
|---|---|
| 1 | IT'S ALMOST TIME TO CLEAN EARPIECES |
| 2 | EARPIECES ARE DIRTY |
| 3 | XX HOURS HAVE PASSED SINCE LAST CLEANING |

MEASUREMENT SYSTEM AND MEASUREMENT METHOD

CROSS-REFERENCE TO RELATED APPLICATIONS

This application is based on and claims priority under 35 USC 119 from Japanese Patent Application No. 2022-003369 filed on Jan. 12, 2022, the contents of which are incorporated herein by reference.

TECHNICAL FIELD

The present disclosure relates to a measurement system and a measurement method.

BACKGROUND ART

U.S. Pat. No. 10,293,158B discloses a measurement system for controlling an ear stimulation device using a personal computing device. In the measurement system, in a case that electrodes are not in good electrical contact with ears of a user, the user is blocked from being provided with a stimulus, and the user is notified of a state of the electrodes. In various situations, the measurement system notifies the user of instructions such as changing a position of an earphone, replacing at least a part of the electrode, washing, wetting, and applying gel.

In recent years, a style has appeared in which a user inserts completely wireless earphones, also called True Wireless Stereo (TWS), into both left and right ears. Such earphones are replaceably fitted with earpieces that plug ears of the user. As the user uses the earphones, there is a problem in that dust or dirt such as earwax is accumulated in speaker portions, which not only makes the earpieces look unattractive, but also makes the earphones difficult to hear a sound. In order to deliver the sound output from the speaker to the ears of the user without lowering the quality of the sound, it is necessary for the user to periodically clean earpieces of the earphones.

U.S. Pat. No. 10,293,158B discloses measuring whether electrodes of earphones and ears of a user are in electrical contact with each other, but it is not assumed to determine whether dust is accumulated in speaker portions of the earphones. Therefore, there is room for improvement in supporting stable delivery of a high-quality sound signal to the ears of the user.

SUMMARY OF INVENTION

The present disclosure has been devised in view of the above circumstances in the related art. An object of the present disclosure is to provide a measurement system and a measurement method that support the cleaning of earphones and suppress a decrease in sound quality of the earphones.

According to an aspect of the present disclosure, there is provided a measurement system including:

- earphones configured to be worn on left and right ears of a user respectively; and
- a wireless terminal, in which
- the earphones measure and accumulate usage time during the earphones are used by a user, and transmit accumulated usage time to the wireless terminal, and
- the wireless terminal acquires the accumulated usage time from the earphones, determines whether the accumulated usage time exceeds predetermined time, and generates a notification for urging the user to clean the earphones when it is determined that the accumulated usage time exceeds the predetermined time.

According to an aspect of the present disclosure, there is provided a measurement method for controlling earphones worn on left and right ears of a user respectively and a wireless terminal, the method including:

- by the earphones, measuring and accumulating usage time during the earphones are used by a user, and transmitting accumulated usage time to the wireless terminal; and
- by the wireless terminal, acquiring the accumulated usage time from the earphones, determining whether the accumulated usage time exceeds predetermined time, and generating a notification for urging the user to clean the earphones when it is determined that the accumulated usage time exceeds the predetermined time.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, it is possible to support the cleaning of earphones and to suppress a decrease in sound quality of the earphones.

BRIEF DESCRIPTION OF DRAWINGS

FIG. 8 is a diagram showing an example of a sound for urging a user to clean the earphones according to the first embodiment.

DESCRIPTION OF EMBODIMENTS

Hereinafter, embodiments in which a measurement system and a measurement method are specifically disclosed in the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

First Embodiment

In a first embodiment, an example will be described in which a measurement system 100 periodically displays, on a display and operation unit (display/operation unit) 30, a message for urging a user to clean earphones 1 based on cumulative time obtained by accumulating usage time of the earphones 1.

Figure 1:
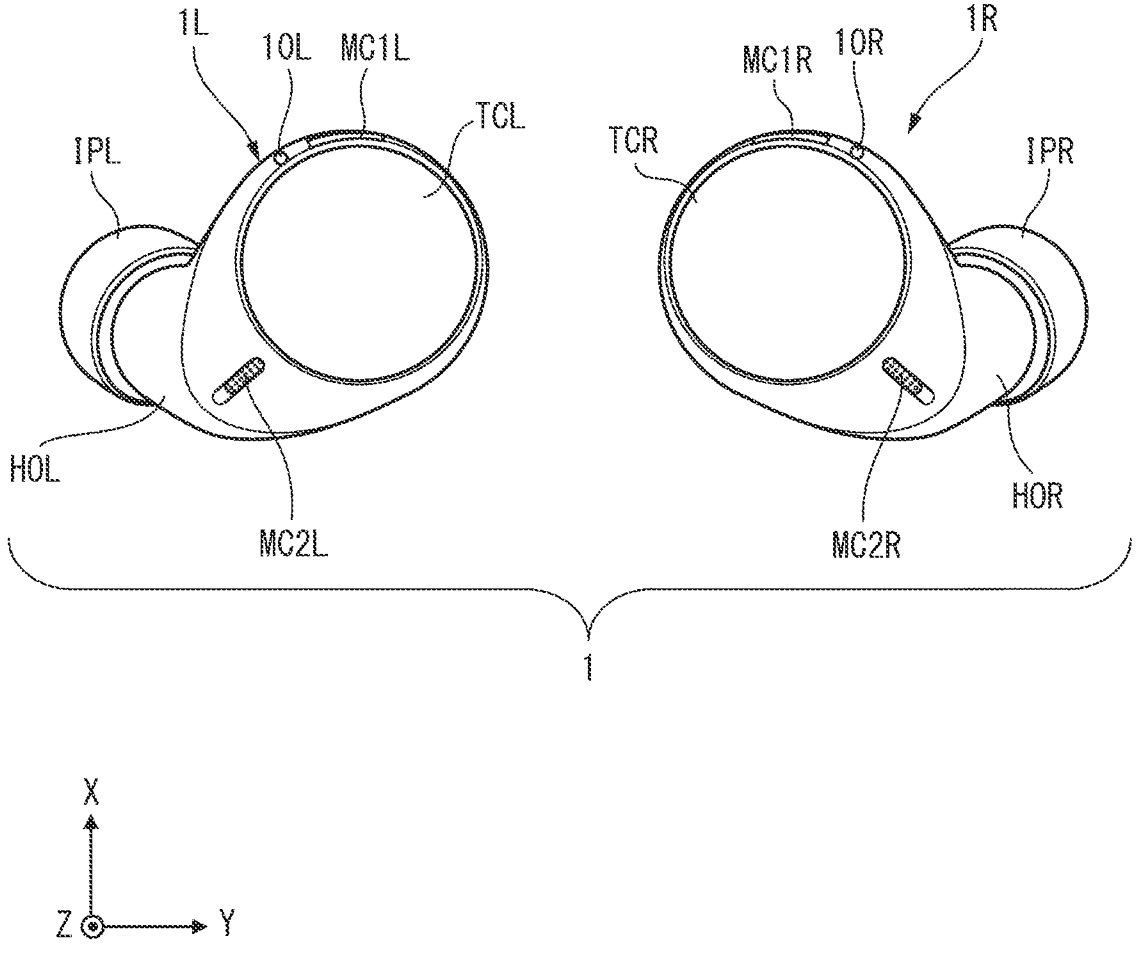
FIG. 1 is a front view of earphones according to the present embodiment.
Figure 2:
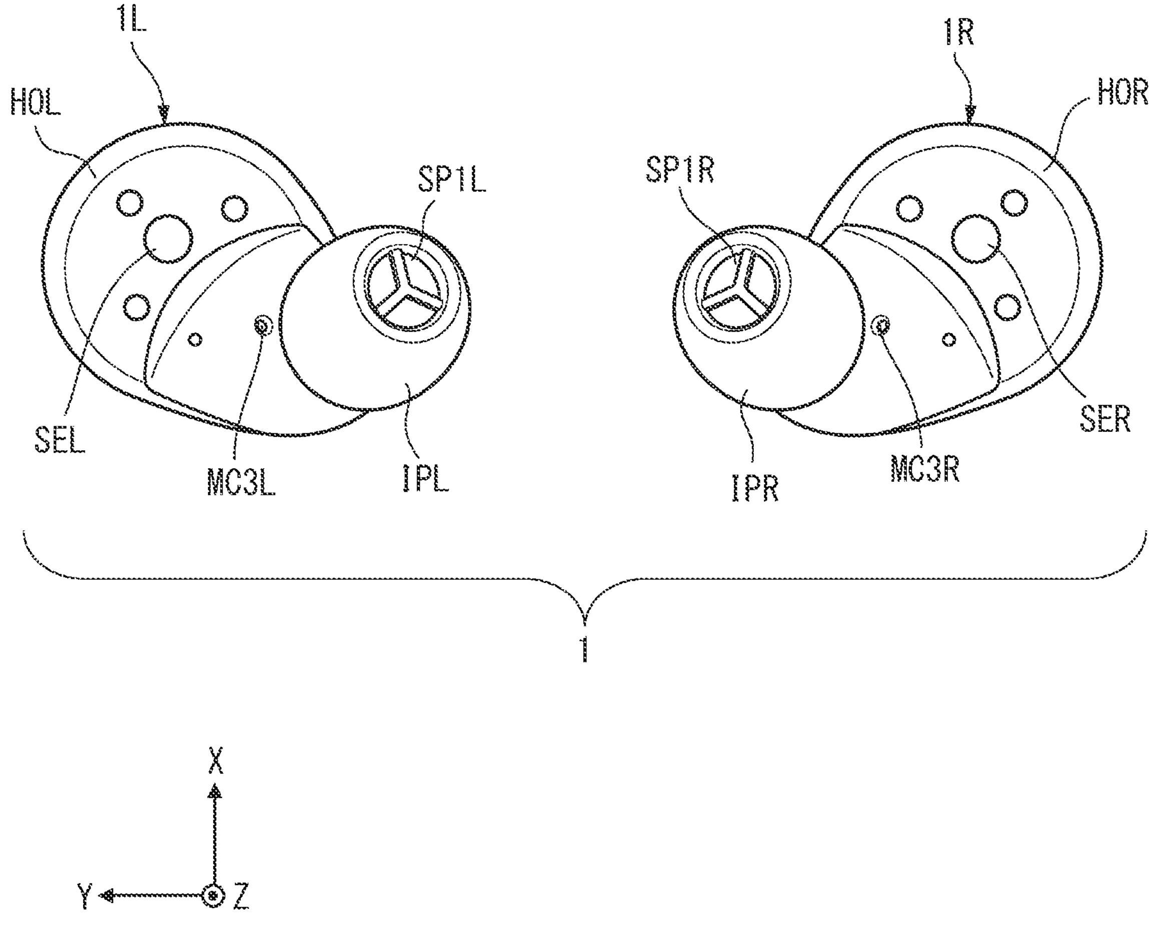
FIG. 2 is a rear view of the earphones according to the present embodiment.

First, hardware configurations of earphones will be described with reference to FIGS. 1 and 2. FIG. 1 shows a front view of the earphones. FIG. 2 shows a rear view of the earphones.

For convenience of explanation, as shown in FIG. 1, an axis orthogonal to a surface of a touch sensor TCL of an earphone 1L is taken as a Z axis. An axis perpendicular to the Z axis (that is, parallel to the touch sensor TCL of the earphone 1L) and extending from the earphone 1L to an earphone 1R is taken as a Y axis. An axis perpendicular to the Y axis and the Z axis is taken as an X axis. In the present embodiment, an orientation of the earphone 1L according to FIG. 1 is defined as the front view. Expressions related to these directions are used for convenience of description, and are not intended to limit a posture of a structure in actual use. The same applies to other drawings.

In the present embodiment, in a pair of left and right earphones 1L and 1R, a left ear earphone 1L and a right ear earphone 1R have the same configuration. Reference numerals in the drawings of the same components are expressed by adding "L" to an end of the reference numeral "1" in a case of the left ear earphone 1L and adding "R" to an end of the reference numeral "1" in a case of the right ear earphone 1R. In the following description, only the earphone 1L on the left side will be described, and the explanation of the earphone 1R on the right side will be omitted.

The earphones 1 are the earphones 1L and 1R that are respectively worn on a left ear and a right ear of a user, and a plurality of earpieces having different sizes are replaceably attached to one end portion of each of the earphones 1L and 1R. The earphones 1 may be configured by two earphones (that is, earphone 1L and earphone 1R) that consist of the earphone 1L worn on the left ear of the user and the earphone 1R worn on the right ear of the user and are independently operable. In this case, the earphone 1L and the earphone 1R can communicate wirelessly (for example, short-range wireless communication such as Bluetooth (registered trademark)). Alternatively, the earphones 1 may be configured as a pair of earphones in which the earphone 1L and the earphone 1R are connected by wire.

As shown in FIG. 1, the earphone 1L is an inner acoustic device used by being worn on the ear of the user, and receives sound data (for example, music data) transmitted wirelessly (for example, short-range wireless communication such as Bluetooth (registered trademark)) from an external device such as a smartphone or a portable music player carried by the user. The earphone 1L acoustically outputs a sound signal based on the received sound data. The earphone 1L is placed on a cradle (not shown), which is a charging case, when not in use. In a case where a battery B1L (FIG. 3) built in the earphone 1L is not fully charged, when the earphone 1L is placed on a predetermined placement of the cradle, the battery B1L built in the earphone 1L is charged based on electric power transmitted from the cradle.

A housing HOL is provided as a structural member of the earphone 1L. The housing HOL is constituted by a composite of materials such as synthetic resin, metal, and ceramic, and a storage space is formed inside the housing HOL. The housing HOL has a cylindrical portion (not shown) whose inner space communicating with the storage space.

The earphone 1L includes an earpiece IPL attached to a main body of the earphone 1L. For example, the earphone 1L is held in the ear of the user by the earpiece IPL while being inserted inside an ear canal of the ear, and the held state is a use state of the earphone 1L.

The earpiece IPL is made of a flexible material such as silicon, and is formed by injection-molding with an inner cylinder (not shown) and an outer cylinder (not shown). The earpiece IPL is fixed by being inserted into the cylindrical portion of the housing HOL at the inner cylinder thereof, and is provided so as to be replaceable (detachable) with respect to the cylindrical portion of the housing HOL. The earpiece IPL is fitted in the ear canal of the user at the outer cylinder thereof, and is elastically deformed according to a shape of the ear canal to be fitted. By the elastic deformation of the earpiece IPL, the earpiece IPL is held in the ear canal of the user. The earpiece IPL has a plurality of different sizes. In the earpiece IPL, an earpiece of any size among a plurality of earpieces of different sizes is attached to the earphone 1L and worn on the left ear of the user (hereinafter, earpiece worn on an ear of the user is referred to as a "worn earpiece").

As an example of an operation input unit, a touch sensor TCL is provided on the other end portion opposite to the one end portion to which the earpiece IPL of the housing HOL is attached as shown in FIG. 1. The touch sensor TCL is a sensor element having a touch sensor function of detecting an input operation (for example, touch operation) of the user. The sensor element is, for example, an electrode of a capacitive touch sensor. The touch sensor TCL may be formed as, for example, a perfect circular surface, or may be formed as, for example, an elliptical surface. The touch sensor TCL may be formed as a rectangular surface.

Examples of the touch operation on the touch sensor TCL by a finger or the like of the user include the following operations. When the touch operation is performed for a short period of time, the earphone 1L may instruct the external device to perform any one of play, stop, fast forward, and rewind, and the like of music. When the touch operation is performed for a long time, the earphone 1L may perform a pairing operation or the like for performing wireless communication such as Bluetooth (registered trademark) with an external device such as a smartphone. When a surface of the touch sensor TCL is traced with a finger (swipe operation), the earphone 1L may perform volume adjustment or the like of the playing music.

A light 10L (example of a light emitting element) is disposed at a position on one end side of a housing of the earphone 1L corresponding to an end portion (for example, end portion on an operation surface along a +X direction) on an operation surface of the touch sensor TCL provided so as to be exposed to the housing HOL. As an example of the light 10L, a light emission diode (LED) may be used. The light 10L is used, for example, when the external device and the earphone 1L are associated with each other on a one-to-one basis (hereinafter, referred to as pairing) by wirelessly communicating with the external device carried by the user. The light 10L indicates operations such as lighting, blinking in a single color, and blinking in a different color when pairing is completed. The use and the operation method of the light 10L are examples and are not limited thereto.

The earphone 1L includes a plurality of microphones (microphone MC1L, microphone MC2L, and microphone MC3L) as electrical and electronic members. The plurality of microphones are stored in the storage space (not shown) of the housing HOL.

As shown in FIG. 1, the microphone MC1L is provided on the housing HOL, and is disposed so as to be able to collect an ambient sound and the like outside the earphone 1L. That is, the microphone MC1L can detect the ambient sound of the user in a state where the earphone 1L is worn on the ear of the user. The microphone MC1L converts an external ambient sound into an electrical signal (sound signal) and transmits the electrical signal to a sound signal input and output control unit S1L.

As shown in FIG. 1, the microphone MC2L is provided on the housing HOL, and is disposed to be able to collect an audio signal based on an utterance of a user wearing the earphone 1L. Therefore, the earphone 1L can realize a hands-free call in a state where the earphone 1L can communicate with a mobile phone device such as the smartphone F1 of the user. The microphone MC2L is configured by a microphone device capable of collecting (that is, detecting the audio signal) the sound generated based on the utterance of the user. The microphone MC2L collects the sound generated based on the utterance of the user, converts the sound into an electrical signal, and transmits the electrical signal to the sound signal input and output control unit S1L. The microphone MC2L is disposed such that an extending direction of the earphone 1L faces a mouth of the user when the earphone 1L is inserted into the left ear of the user (see FIG. 1), and is disposed at a position below the touch sensor TCL (that is, −X direction). A sound uttered by the user is collected by the microphone MC2L and converted into an electrical signal, and the microphone MC2L can detect whether the user has uttered based on an amplitude of the electrical signal.

As shown in FIG. 2, the microphone MC3L is disposed in a plane near the cylindrical portion of the housing HOL, and is disposed as close as possible to the ear canal of the left ear of the user. The microphone MC3L converts a sound leaking from a gap between the ear of the user and the earpiece IPL in a state where the earphone 1L is worn on the ear of the user into an electrical signal (sound signal) and transmits the electrical signal to the sound signal input and output control unit S1L.

As shown in FIG. 2, a speaker SP1L is disposed in the cylindrical portion of the housing HOL. The speaker SP1L is an electronic component and acoustically outputs sound data (for example, music data) wirelessly transmitted from the external device. In the housing HOL, a front surface of the speaker SP1L (in other words, sound emission surface of a sound acoustically output) is directed toward the cylindrical portion of the housing HOL covered with the earpiece IPL. Accordingly, the music data acoustically output from the speaker SP1L is further transmitted from an ear hole (for example, external ear portion) of the user to an internal ear and an eardrum, and the user can listen to the music data.

A wearing sensor SEL is configured by a device that detects whether the earphone 1L is worn on the left ear of the user, and is configured by using, for example, an infrared sensor or an electrostatic sensor. In a case of the infrared sensor, if the earphone 1L is worn on the left ear of the user, the wearing sensor SEL can detect that the earphone 1L is worn on the left ear of the user by receiving infrared rays reflected in the left ear by infrared rays emitted from the wearing sensor SEL. If the earphone 1L is not worn on the left ear of the user, the wearing sensor SEL can detect that the earphone 1L is not worn on the left ear of the user by not reflecting the infrared rays emitted from the wearing sensor SEL and not receiving the infrared rays. In a case of the electrostatic sensor, if the earphone 1L is worn on the left ear of the user, the wearing sensor SEL can detect that the earphone 1L is worn on the left ear of the user by determining that a change value of an electrostatic capacitance according to a distance to an inside of the left ear of the user is larger than a threshold held by the wearing sensor SEL. If the earphone 1L is not worn on the left ear of the user, the wearing sensor SEL can detect that the earphone 1L is not worn on the left ear of the user by determining that the change value of the electrostatic capacitance is smaller than the threshold held by the wearing sensor SEL. The wearing sensor SEL is provided at a position facing the ear canal when the earphone 1L is inserted into the left ear of the user and on a back side of the touch sensor TCL.

Thus, the earphone 1L includes the speaker SP1L and the microphone MC3L, and the worn earpiece, which is one of the plurality of earpieces, is worn on the left ear or the right ear of the user.

Figure 3:
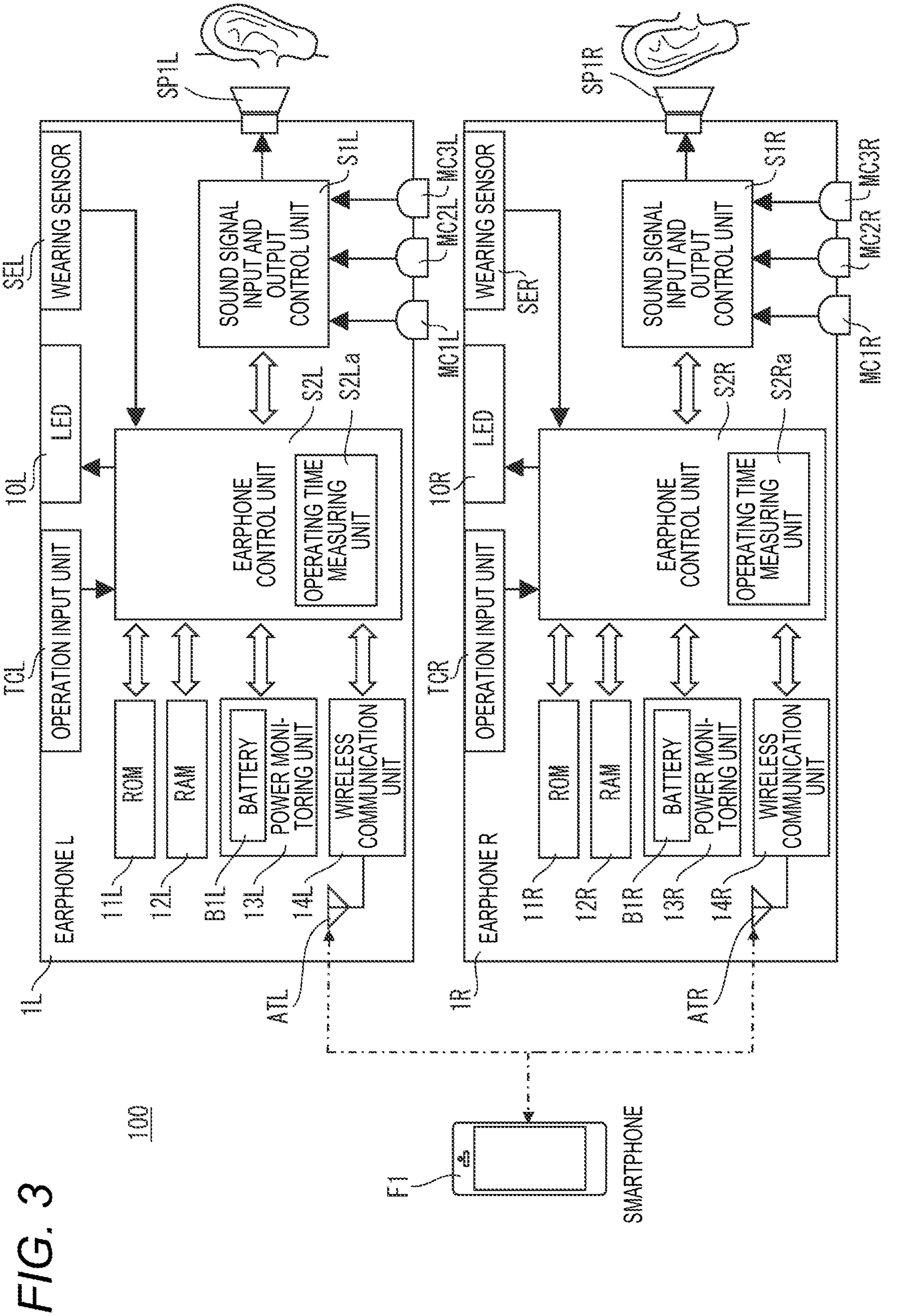
FIG. 3 is a block diagram of the earphones according to the present embodiment.

Next, a block diagram of the earphones will be described with reference to FIG. 3. FIG. 3 is a block diagram of the earphones according to the present embodiment. FIG. 3 is a block diagram of each of the pair of left and right earphones 1L and 1R shown in FIGS. 1 and 2. Although a configuration of the earphone 1L of the pair of left and right earphones 1L and 1R will be described below, a configuration of the earphone 1R is the same as the configuration of the earphone 1L. Therefore, the explanation of the earphone 1R is also omitted in FIG. 3.

A measurement system 100 includes the earphone 1L, the earphone 1R, and the smartphone F1.

The touch sensor TCL, which is an example of the operation input unit, is communicably connected to an earphone control unit S2L. The touch sensor TCL outputs a signal related to a touch operation performed by the user to the earphone control unit S2L.

The wearing sensor SEL is communicably connected to the earphone control unit S2L, and outputs a signal indicating whether the ear of the user and the earphone 1L are in contact with each other to the earphone control unit S2L.

A power monitoring unit 13L is configured using, for example, a semiconductor chip. The power monitoring unit 13L includes the battery B1L and measures a battery level of the battery B1L. The battery B1L is, for example, a lithium ion battery. The power monitoring unit 13L outputs information on the measured battery level of the battery B1L to the earphone control unit S2L.

The sound signal input and output control unit S1L is configured using, for example, a processor such as a central processing unit (CPU), a micro processing unit (MPU), or a digital signal processor (DSP). The sound signal input and output control unit S1L is communicably connected to the earphone control unit S2L, and exchanges a sound signal with a digital signal converted into a digital format by a pulse code modulation (PCM) method. The sound signal input and output control unit S1L adjusts a volume level of a digital signal related to a sound signal acquired from the smartphone F1 and outputs the digital signal to the speaker SP1L.

The sound signal input and output control unit S1L is connected to the microphone MC1L, the microphone MC2L, and the microphone MC3L, and a sound signal collected by each microphone is input from each microphone. The sound signal input and output control unit S1L can perform processing such as amplifying the sound signal input from each microphone, converting an analog signal into a digital signal, and the like. The sound signal input and output control unit transmits data of the sound signal input from each microphone to the earphone control unit S2L.

The earphone control unit S2L is configured using, for example, a processor such as a CPU, an MPU, or a DSP, is communicably connected to the sound signal input and output control unit S1L, a ROM 11L, a RAM 12L, the power monitoring unit 13L, and a wireless communication unit 14L, and exchanges the sound signal with the digital signal converted into a digital format by the PCM method. The earphone control unit S2L functions as a controller that controls an overall operation of the earphone 1L, and performs control processing for controlling the operation of each unit of the earphone 1L, data input and output processing between units of the earphone 1L, data calculation processing, and data storage processing with each unit of the earphone 1L. The earphone control unit S2L includes a usage time measuring unit S2La as an example of a measuring unit.

When the earphone control unit S2L acquires a signal input from the touch sensor TCL, the earphone control unit S2L turns on or blinks the light 10L. For example, when the earphone 1L is paired with an external device by wireless communication such as Bluetooth (registered trademark), the light 10L alternately blinks in a single color or different colors. This is an example, and the operation of the light 10L is not limited thereto. The earphone control unit S2L may acquire information on the battery level of the battery B1L from the power monitoring unit 13L, and may turn on and blink the light 10L according to the battery level of the battery B1L.

As an example of the measuring unit, the usage time measuring unit S2La measures time (hereinafter, referred to as usage time) when the earphone 1L is used by the user. The usage time measuring unit S2La accumulates the measured usage time. The usage time measuring unit S2La starts accumulation of the usage time from a predetermined timing (for example, when the user uses the earphones for the first time after purchasing). The predetermined timing may not be limited to the first use of the earphones described above. The usage time measuring unit S2La uses a random access memory (RAM) 12L and temporarily stores the generated data in the RAM 12L. The usage time is, for example, time during a sound signal is output from the speaker SP1L and time during the user makes a call using the earphone 1L. The usage time may be only the time during the sound signal is output from the speaker SP1L, or may be the time during the user makes a call using the earphone 1L. The usage time may be time during the wearing sensor SEL detects that the earphone 1L is worn on the left ear of the user.

The sound signal input and output control unit S1L and the earphone control unit S2L implement respective functions by using programs and data stored in a read only memory (ROM) 11L. The sound signal input and output control unit S1L and the earphone control unit S2L may temporarily store generated or acquired data or information in the RAM 12L by using the RAM 12L during operation.

The wireless communication unit 14L wirelessly connects the earphone 1L and the smartphone F1 so as to be able to transmit and receive the sound signal, and transmits a sound signal processed by the sound signal input and output control unit S1L or the earphone control unit S2L to the smartphone F1. The wireless communication unit 14L includes an antenna ATL, and performs short-range wireless communication in accordance with a communication standard of, for example, Bluetooth (registered trademark). The wireless communication unit 14L may be provided so as to be connectable to a communication line such as Wi-Fi (registered trademark), a mobile communication line, or the like. Each of the earphones 1L and 1R can individually perform wireless communication with the smartphone F1 using the wireless communication unit 14L and a wireless communication unit 14R. Therefore, each of the earphones 1L and 1R can receive data, a sound signal, or information transmitted from the smartphone F1.

The smartphone F1 is a wireless terminal carried by the user.

Figure 4:
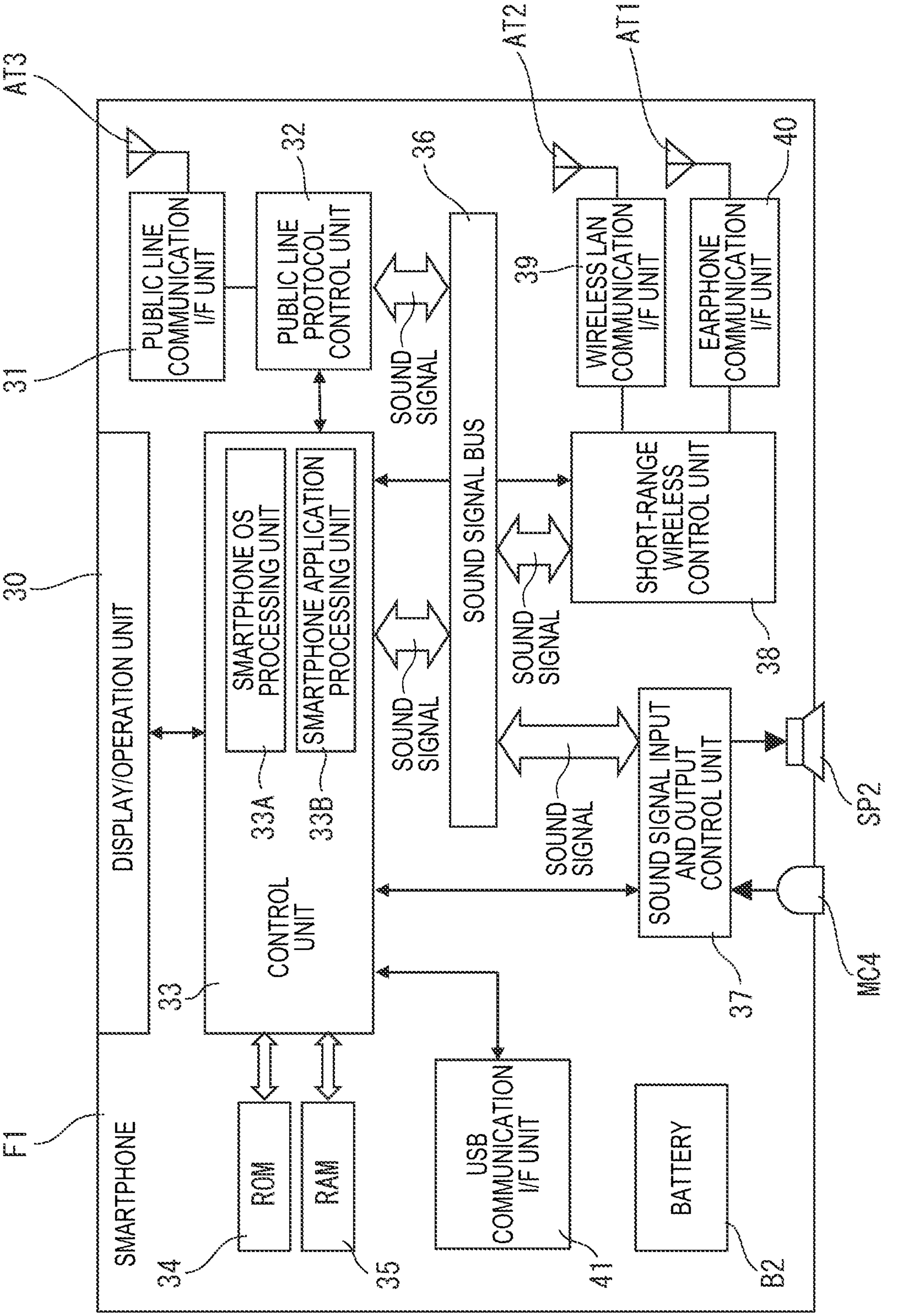
FIG. 4 is a block diagram of a smartphone according to the present embodiment.

Next, with reference to FIG. 4, a hardware configuration example of the smartphone will be described using a block diagram of the smartphone. FIG. 4 is a block diagram of the smartphone according to the present embodiment. The smartphone F1 includes a display and operation unit (display/operation unit) 30, a mobile line communication I/F unit 31, a mobile line protocol control unit 32, a control unit 33, a ROM 34, a RAM 35, a sound signal bus 36, a sound signal input and output control unit 37, a short-range wireless control unit 38, a wireless LAN communication I/F unit 39, an earphone communication I/F unit 40, a USB communication I/F unit 41, and a battery B2. In FIG. 4, the interface is abbreviated as “IF”.

The display/operation unit 30 as an example of a display unit or an operation unit is configured using a touch panel that receives an operation of the user and displays data generated by the control unit 33, and forms a user interface. The display/operation unit 30 may display various screens generated by the control unit 33. The display/operation unit 30 receives operations of the user on the displayed various screens, generates an input signal, and transmits the input signal to the control unit 33.

The mobile line communication I/F unit 31 is connected to an antenna AT3 included in the smartphone F1, and performs wireless communication (for example, wireless communication conforming to a 4th generation mobile communication system (4G) such as a long term evolution (LTE) or a 5th generation mobile communication system (5G)) using a mobile line with a public base station (not shown). The mobile line communication I/F unit may be omitted from the configuration of the smartphone F1.

The mobile line protocol control unit 32 executes control related to input and output of data between the sound signal bus 36 and the mobile line communication I/F unit 31. The mobile line protocol control unit 32 may be omitted from the configuration of the smartphone F1.

The control unit 33 is configured using, for example, a processor such as a CPU, an MPU, or a DSP. The control unit 33 functionally includes a smartphone OS processing unit 33A and a smartphone application processing unit 33B, and performs various processing and controls by cooperation of the smartphone OS processing unit 33A and the smartphone application processing unit 33B with the ROM 34.

A program that defines an operation of the control unit 33 and data used when the program is executed are written in the ROM 34. The ROM 34 stores identification information of the smartphone F1 and identification information of the earphones 1 registered (paired) in advance as a destination to which the sound signal is transmitted.

The RAM 35 is a RAM as a work memory used when each processing of the control unit 33 is executed, and temporarily stores data or information generated or acquired by the control unit 33.

The sound signal bus 36 inputs and outputs sound signal data to and from the control unit 33, sound signal data to and from the mobile line protocol control unit 32, sound signal data to and from the sound signal input and output control unit 37, and sound signal data to and from the short-range wireless control unit 38.

The sound signal input and output control unit 37 transmits sound signal data collected by a microphone MC4 to the control unit 33 via the sound signal bus 36, or outputs a sound signal input via the sound signal bus 36 from a speaker SP2, based on a command output from the control unit 33.

The microphone MC4 collects a sound based on an utterance of the user using the smartphone F1, converts the sound into a sound signal, and transmits the converted sound signal to the sound signal input and output control unit 37. The sound signal collected by the microphone MC4 is input to the control unit 33 via the sound signal input and output control unit 37 and the sound signal bus 36.

The speaker SP2 acoustically outputs sound signal data from the sound signal input and output control unit 37.

The short-range wireless control unit 38 executes control related to input and output of data between the sound signal bus 36 and the wireless LAN communication I/F unit 39 and between the sound signal bus 36 and the earphone communication I/F unit 40. The short-range wireless control unit 38 transmits the command output from the control unit 33 and data of the sound signal input via the sound signal bus 36 to the wireless LAN communication I/F unit 39 or the earphone communication I/F unit 40. The short-range wireless control unit 38 may transmit data of a sound signal input from the wireless LAN communication I/F unit 39 or the earphone communication I/F unit 40 to the control unit 33.

The wireless LAN communication I/F unit 39 is connected to an antenna AT2 included in the smartphone F1, and performs wireless communication (for example, data transmission from the short-range wireless control unit 38) with the earphones 1 through a wireless LAN. The wireless LAN communication I/F unit 39 is configured using a communication circuit connectable to the Internet via a wireless LAN router (not shown). The wireless LAN communication I/F unit 39 may perform wireless communication (for example, wireless LAN such as Wi-Fi (registered trademark)) with each of the earphones 1L and 1R via the wireless LAN router (not shown).

The earphone communication I/F unit 40 is connected to an antenna AT1 included in the smartphone F1, and performs short-range wireless communication (for example, data transmission from the short-range wireless control unit 38) with the earphone 1 by the Bluetooth.

The USB communication I/F unit 41 is an interface for communicating the smartphone F1 with an external device (for example, personal computer (PC)) by wire such as a cable. The USB communication I/F unit 41 is connected to the control unit 33 so that data communication is possible, and can transmit data from the external device to the control unit 33. Electric charge may be supplied from an external power source to the battery B2 via the USB communication I/F unit 41.

The battery B2 supplies power to the smartphone F1, which is a battery capable of storing the electric charge supplied from the external power source. The battery B2 may be configured to be detachable. The battery B2 may directly receive the supply of power from the external power source, or can supply power to the smartphone F1 in a state where the battery B2 is disconnected from the external power source.

Figure 5:
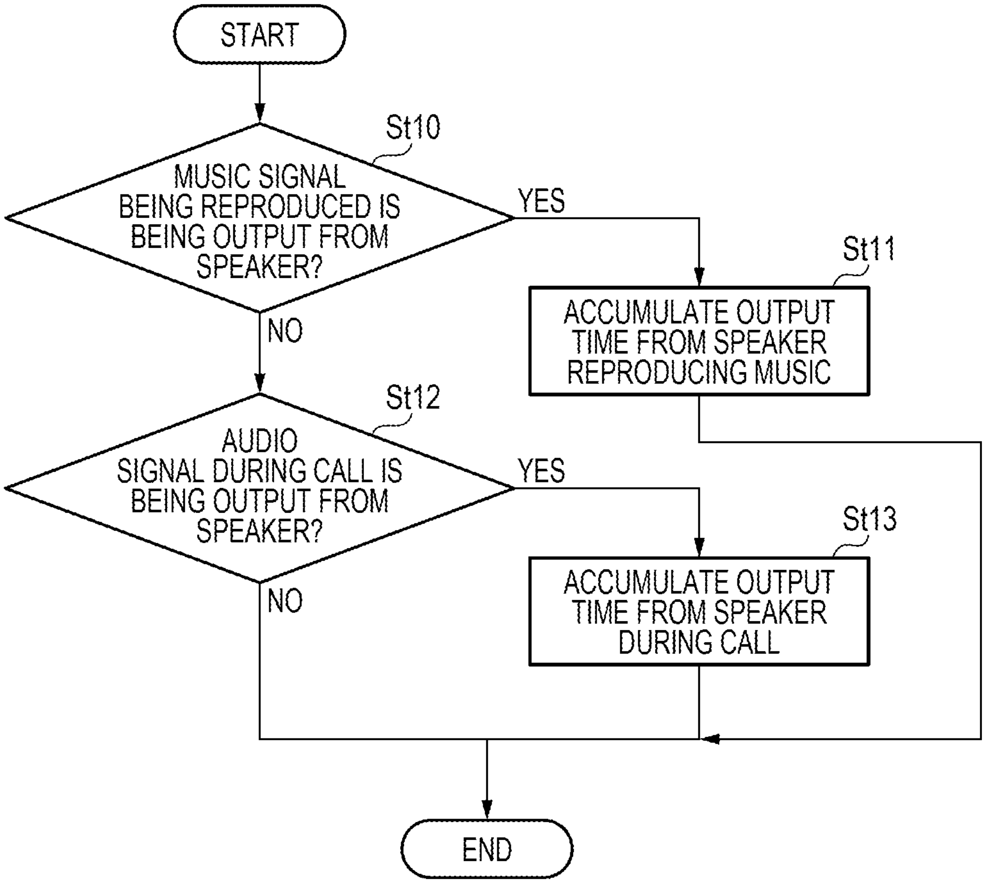
FIG. 5 is a flowchart showing a process of accumulating usage time of earphones according to a first embodiment.

Next, a process of accumulating the usage time of the earphones according to the first embodiment will be described with reference to FIG. 5. FIG. 5 is a flowchart showing a process of accumulating the usage time of the earphones according to the first embodiment. Each processing of the flowchart according to FIG. 5 is executed by usage time measuring units S2La and S2Ra. The processing of the flowchart according to FIG. 5 is periodically executed. In FIG. 5, examples of the process of accumulating the usage time of the earphones include a process of playing (that is, outputting from the speaker) a music signal listened to by the user and a process of outputting (that is, outputting from the speaker) an audio signal uttered by the other party when the user is talking with the other party via the earphones, but it is needless to say that the process is not limited to these processes.

The usage time measuring units S2La and S2Ra acquire, from the earphone control units S2L and S2R, information on whether music signals being played are being output from the speakers SP1L and SP1R (St10). That is, the usage time measuring units S2La and S2Ra determine whether the music signals listened to by the user are output from the speakers SP1L and SP1R and are being played (St10). Here, music has been described as an example, but the sound played by the speakers SP1L and SP1R is not limited to the music, and may be a sound signal of a movie played by an external device (smartphone F1 in the present embodiment), a sound signal of a radio, or the like.

When the usage time measuring units S2La and S2Ra determine that the music signals are being played (output) from the speakers SP1L and SP1R (St10, YES), the usage time measuring units S2La and S2Ra measure output time from the speakers SP1L and SP1R which played the music, and accumulate the measured time as the usage time (St11). The processing of the usage time measuring units S2La and S2Ra ends the processing of FIG. 5 when the processing of step St11 ends.

When the usage time measuring units S2La and S2Ra determine that the music signals are not being played (output) from the speakers SP1L and SP1R in the processing of step St10 (St10, NO), the usage time measuring units S2La and S2Ra acquire information on whether audio signals during a call by the user are being output from the speakers SP1L and SP1R from the earphone control units S2L and S2R (St12). That is, the usage time measuring units S2La and S2Ra determine whether the audio signals during the call by the user are being output from the speakers SP1L and SP1R (St12).

When the usage time measuring units S2La and S2Ra determine that the audio signals during the call are being output from the speakers SP1L and SP1R (St12, YES), the usage time measuring units S2La and S2Ra measure output time of the audio signals during the call from the speakers SP1L and SP1R, and accumulate the measured time as the usage time (St13). The processing of the usage time measuring units S2La and S2Ra ends the processing of FIG. 5 when the processing of step St13 ends.

When the usage time measuring units S2La and S2Ra determine in the processing of step St12 that the audio signals during the call are not being output from the speakers SP1L and SP1R (St12, NO), the processing of FIG. 5 ends.

Thus, the earphones 1L and 1R have the speakers SP1L and SP1R capable of playing the music signals, and the usage time is time during the music signals are played from the speakers SP1L and SP1R.

The earphones 1L and 1R include the speakers SP1L and SP1R capable of playing the music signals and outputting the audio signals during the call, and the usage time may be total time of time during the music signals are played from the speakers SP1L and SP1R and time during the audio signals are output from the speakers SP1L and SP1R during the call.

The earphones 1L and 1R include wearing sensors SEL and SER that detect whether the earphones 1L and 1R are worn on the ears of the user, and the usage time may be time during the wearing sensors SEL and SER detect that the earphones 1L and 1R are worn on the ears of the user.

Figure 6:
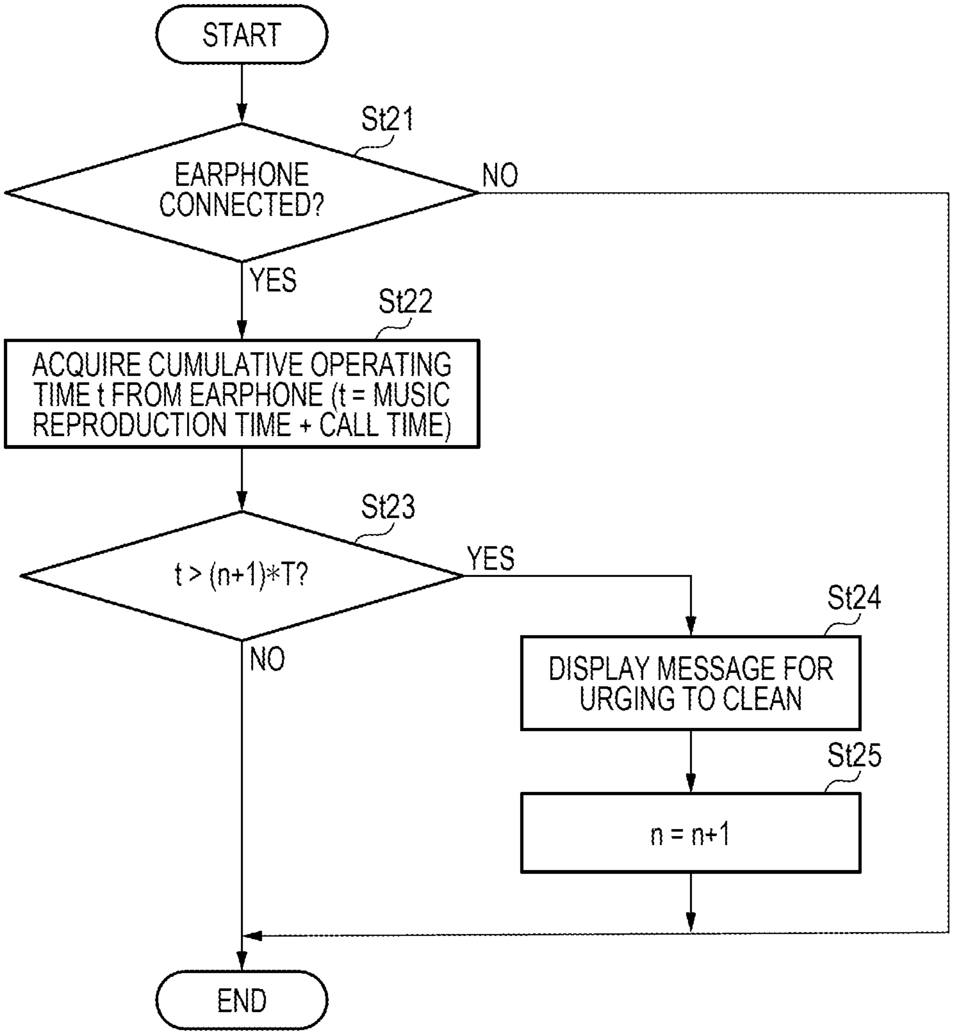
FIG. 6 is a flowchart for periodically displaying a screen for urging a user to clean the earphones according to the first embodiment.

Next, a process of periodically displaying a screen for urging the user to clean the earphones according to the first embodiment will be described with reference to FIG. 6. FIG. 6 is a flowchart for periodically displaying the screen for urging the user to clean the earphones according to the first embodiment. Each processing of the flowchart according to FIG. 6 is executed by the control unit 33. The processing of the flowchart according to FIG. 6 is periodically executed.

The control unit 33 acquires a signal indicating whether the smartphone F1 is connected to the earphones 1L and 1R from the short-range wireless control unit 38 (St21). When the control unit 33 acquires a signal indicating that the smartphone F1 is connected to neither the earphone 1L nor the earphone 1R from the short-range wireless control unit 38 in the processing of step St21 (St21, NO), the control unit 33 ends the processing of FIG. 6.

When the control unit 33 acquires a signal indicating that the smartphone F1 is connected to either the earphone 1L or the earphone 1R from the short-range wireless control unit 38 in the processing of step St21 (St21, YES), the control unit 33 requests the short-range wireless control unit 38 to acquire cumulative usage time t. Here, the cumulative usage time t is defined as usage time accumulated in the processing in the usage time measuring units S2La and S2Ra according to FIG. 5. The cumulative usage time t is total time of time during the music is played by the earphones 1L and 1R and time during the user makes a call using the earphones 1L and 1R. The cumulative usage time t may be time during the wearing sensors SEL and SER detect that the earphones 1L and 1R are worn on the ears of the user. When the short-range wireless control unit 38 acquires a signal for acquiring the cumulative usage time t from the control unit 33, the short-range wireless control unit 38 requests wireless communication units 14L and 14R to acquire the cumulative usage time t via the wireless LAN communication I/F unit 39 or the earphone communication I/F unit 40. When the wireless communication units 14L and 14R acquire a signal for acquiring the cumulative usage time t from the short-range wireless control unit 38, the wireless communication units 14L and 14R requests the usage time measuring units S2La and S2Ra to acquire the cumulative usage time t. When the usage time measuring units S2La and S2Ra acquire a signal for acquiring the cumulative usage time t from the wireless communication units 14L and 14R, the usage time measuring units S2La and S2Ra transmit the cumulative usage time t to the wireless communication units 14L and 14R. When the wireless communication units 14L and 14R acquire the cumulative usage time t from the usage time measuring units S2La and S2Ra, the wireless communication units 14L and 14R transmit the cumulative usage time t to the short-range wireless control unit 38. When the short-range wireless control unit 38 acquires the cumulative usage time t from the wireless communication units 14L and 14R, the short-range wireless control unit 38 transmits the cumulative usage time t to the control unit 33. The control unit 33 acquires the cumulative usage time t from the short-range wireless control unit 38 (St22).

The control unit 33 determines whether the cumulative usage time t satisfies the below Formula 1 (St23). Here, n is a parameter indicating the number of times the display/operation unit 30 displays a message for urging the user to clean the earphones 1. T is predetermined time (hereinafter, referred to as specified time T) until a message for urging the user to clean the earphones 1L and 1R is displayed.

[Formula 1]

$$t>(n+1)\times T \tag{1}$$

When the cumulative usage time t satisfies the Formula 1 in the processing of step St23 (St23, YES), the control unit 33 generates a screen including the message for urging the user to clean the earphones 1L and 1R, and transmits the screen to the display/operation unit 30. The display/operation unit 30 displays the screen acquired from the control unit 33 (St24). Instead of a process of displaying the screen including the message for urging the user to clean the earphones 1L and 1R, the processing of step St24 may be a process in which the control unit 33 transmits sound signals for urging the user to clean the earphones 1L and 1R to the earphones 1L and 1R and outputs the sound signals from the speakers SP1L and SP1R of the earphones 1L and 1R. The processing of step St24 may include both the process of displaying the screen including the message for urging the user to clean the earphones 1L and 1R and the process in which the control unit 33 transmits the sound signals for urging the user to clean the earphones 1L and 1R to the earphones 1L and 1R and outputs the sound signals from the speakers SP1L and SP1R of the earphones 1L and 1R.

The control unit 33 increments the number of times n the display/operation unit 30 displays the message for urging the user to clean the earphones 1 (St25), and the processing according to FIG. 6 ends.

When the cumulative usage time t does not satisfy the Formula 1 in the processing of step St23 (St23, NO), the control unit 33 ends the processing according to FIG. 6.

In this way, the earphones 1L and 1R transmit the cumulative usage time t to the smartphone F1. The smartphone F1 acquires the cumulative usage time t from the earphones 1L and 1R. The smartphone F1 determines whether the cumulative usage time t exceeds predetermined time. When the smartphone F1 determines that the cumulative usage time t exceeds the predetermined time, the smartphone F1 generates a notification for urging the user to clean the earphones 1L and 1R.

In this way, after playing the notification, the smartphone F1 generates the notification each time it is determined that the cumulative usage time t exceeds the predetermined time.

Figure 7:
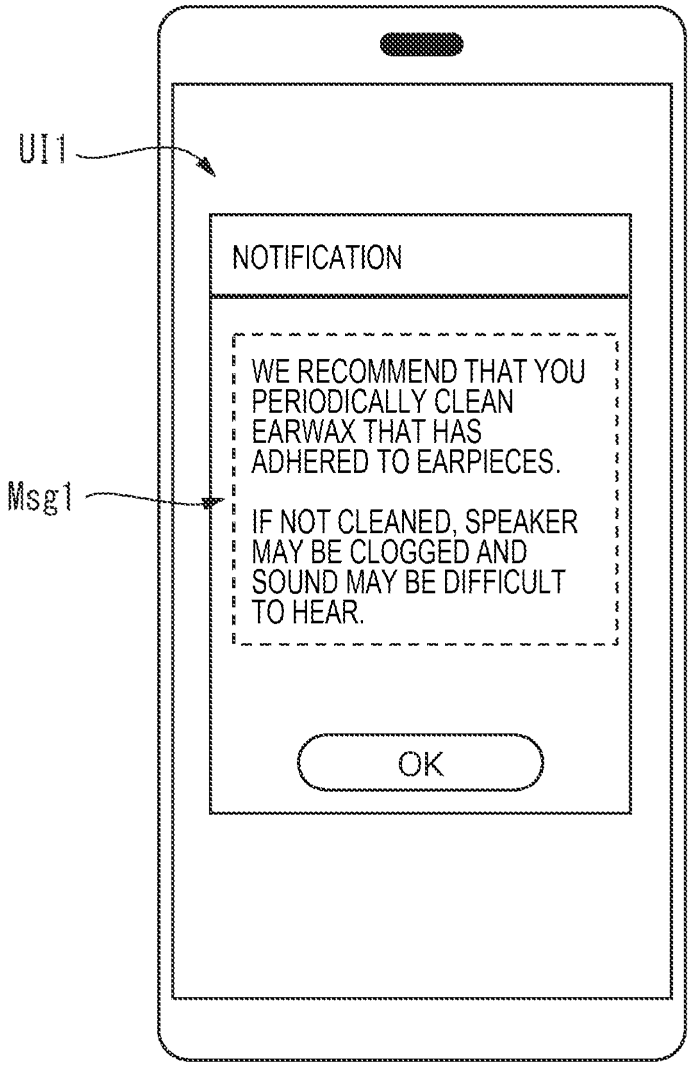
FIG. 7 is a diagram showing an example of a screen for urging a user to clean the earphones according to the first embodiment.

Next, an example of the screen for urging the user to clean the earphones according to the first embodiment will be described with reference to FIG. 7. FIG. 7 is a diagram showing an example of the screen for urging the user to clean the earphones according to the first embodiment.

A screen example UI1 is an example of a screen displayed on the display/operation unit 30. The screen example UI1 includes a message Msg1 for urging the user to clean the earphones 1L and 1R.

The message Msg1 includes, for example, "we recommend that you periodically clean the earwax that has adhered to the earpieces" and "if not cleaned, the speakers may be clogged and the sound may be difficult to hear". The message Msg1 is an example and is not limited thereto.

In this way, the notification is the screen including the message for urging the user to clean the earphones 1L and 1R, and the smartphone F1 displays the screen on the display/operation unit 30.

In this way, the measurement system 100 periodically displays the message for urging the user to clean the earphones 1L and 1R on the display/operation unit 30 based on the usage time of the earphones 1L and 1R to support the cleaning of the earphones. Accordingly, the measurement system 100 can prevent a decrease in sound quality of the earphones 1L and 1R.

Next, an example of a sound for urging the user to clean the earphones according to the first embodiment will be described with reference to FIG. 8. FIG. 8 is a diagram showing an example of a sound for urging the user to clean the earphones according to the first embodiment.

The measurement system 100 may use an audio signal as a notification for urging the user to clean the earphones 1L and 1R. The audio signal includes, for example, "it's almost time to clean the earpieces", "the earpieces are dirty", and "XX hours have passed since the last cleaning".

The notification according to the measurement system 100 may be a notification based on the display of the screen shown in FIG. 7, or may be a notification based on the output of the audio signal shown in FIG. 8. The notification according to the measurement system 100 may be both the notification based on the display of the screen shown in FIG. 7 and the notification based on the output of the audio signal shown in FIG. 8.

In this way, the measurement system 100 periodically performs a notification for urging the user to clean the earphones based on the usage time of the earphones 1L and 1R. Accordingly, the measurement system 100 can support the user to clean the earphones 1L and 1R, and can prevent a decrease in the sound quality of the earphones 1L and 1R.

Second Embodiment

In a second embodiment, an example will be described in which the user can select a timing of message display on the smartphone F1 when the message for urging the user to clean the earphones 1 is displayed on the display/operation unit 30 based on the usage time of the earphones 1.

Since the configurations of the earphones 1L and 1R and the smartphone F1 according to the second embodiment are the same as the configurations of the earphones 1L and 1R and the smartphone F1 according to the first embodiment, the description of the same contents as those in the first embodiment will be simplified or omitted with reference to the same reference numerals, and different contents will be described.

Figure 9:
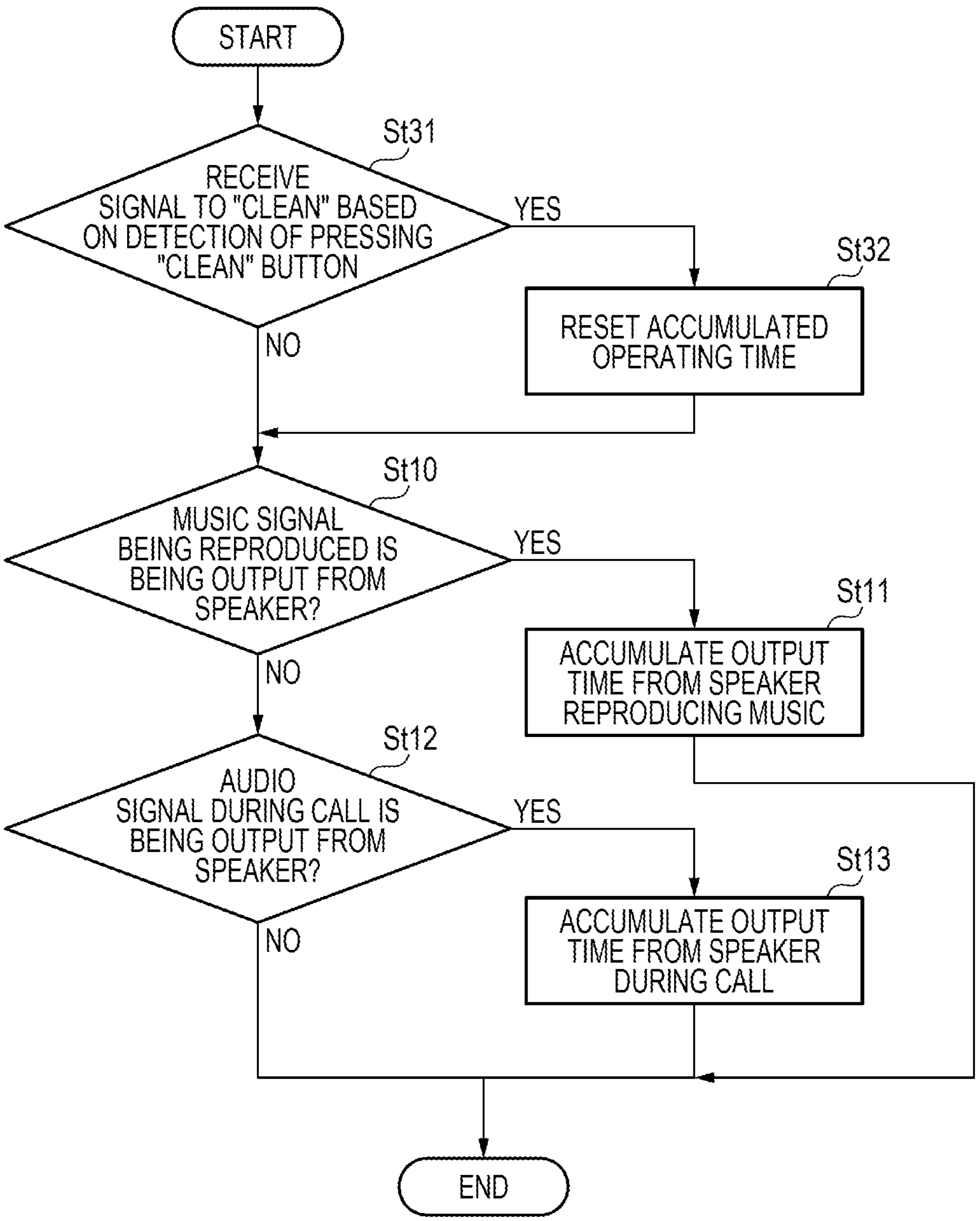
FIG. 9 is a flowchart showing a process of accumulating usage time of earphones according to a second embodiment.

A process of accumulating usage time of earphones according to the second embodiment will be described with reference to FIG. 9. FIG. 9 is a flowchart showing a process of accumulating the usage time of the earphones according to the second embodiment. Each processing of the flowchart according to FIG. 9 is executed by the usage time measuring units S2La and S2Ra. The processing of the flowchart according to FIG. 9 is periodically executed.

When the control unit 33 detects that a confirmation button (button BT1 in FIG. 11) (hereinafter, referred to as "cleaning execution button") displayed on the display/operation unit 30 indicating that a cleaning of the earphones 1L and 1R is executed now is pressed by the user, the control unit 33 transmits a signal indicating that the cleaning execution button is pressed to the earphones 1L and 1R.

When the usage time measuring units S2La and S2Ra receive a signal indicating that a press of the cleaning execution button by the user is detected from the smartphone F1 (St31, YES), the usage time measuring units S2La and S2Ra reset the cumulative usage time t to 0 (St32). Thereafter, the processing of the usage time measuring units S2La and S2Ra proceeds to the processing of step St10.

When the usage time measuring units S2La and S2Ra do not receive the signal indicating that the press of the cleaning execution button by the user is detected from the smartphone F1 (St31, NO), the processing of the usage time measuring units S2La and S2Ra proceeds to the processing of step St10.

Since the subsequent processing of steps St10, St11, St12, and St13 are the same as the processing of steps St10, St11, St12, and St13 according to the flowchart of FIG. 5, the description thereof will be omitted.

Figure 10:
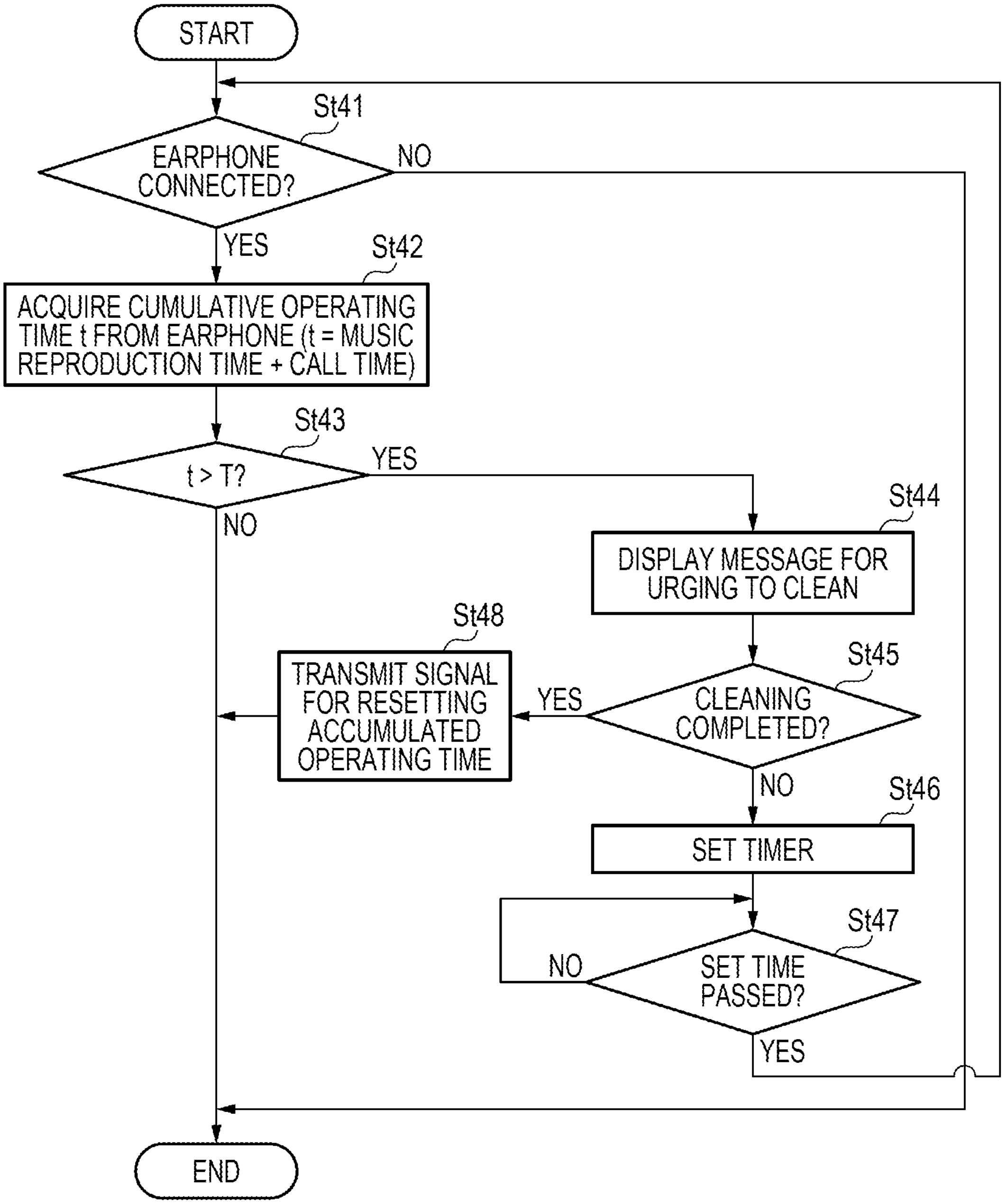
FIG. 10 is a flowchart for displaying a screen for urging a user to clean the earphones according to the second embodiment.

Next, a process of displaying a screen for urging the user to clean the earphones according to the second embodiment will be described with reference to FIG. 10. FIG. 10 is a flowchart for displaying a screen for urging the user to clean the earphones according to the second embodiment. Each processing of the flowchart of FIG. 10 is executed by the control unit 33. The processing of the flowchart according to FIG. 10 is periodically executed. It is assumed that power of the smartphone F1 is on while the processing of the flowchart of FIG. 10 is performed.

The processing of step St41 is the same as the processing of step St21 according to the flowchart of FIG. 6. The processing of step St42 is the same as the processing of step St22 according to the flowchart of FIG. 6. Therefore, the description of the processing of steps St41 and St42 will be omitted.

When the cumulative usage time t is smaller than or equal to the specified time T (St43, NO), the control unit 33 ends the processing according to the flowchart of FIG. 10.

When the cumulative usage time t is greater than the specified time T (St43, YES), the control unit 33 generates a screen including the message for urging the user to clean the earphones 1L and 1R, the confirmation button indicating that the earphones 1L and 1R are cleaned now, and a confirmation button indicating that the earphones 1L and 1R are not cleaned now, and transmits the screen to the display/operation unit 30. The display/operation unit 30 displays the screen acquired from the control unit 33 (St44).

The display/operation unit 30 transmits a signal related to an input content of the user with respect to the screen displayed in the processing of step St44 to the control unit 33. When the user presses the confirmation button indicating that the earphones 1L and 1R are cleaned now, the display/operation unit 30 transmits a signal indicating that cleaning of the earphones 1L and 1R is completed to the control unit 33. When the user presses the confirmation button indicating that the earphones 1L and 1R are not cleaned now, the display/operation unit 30 transmits a signal indicating that the cleaning of the earphones 1L and 1R is not completed to the control unit 33. The control unit 33 acquires the input content of the user with respect to the screen displayed in the processing of step St44 from the display/operation unit 30 (St45). When the control unit 33 acquires the signal indicating that the cleaning of the earphones 1L and 1R is completed from the display/operation unit 30 (St45, YES), the control unit 33 transmits a signal indicating that the cumulative usage time t is reset to 0 to the earphones 1L and 1R (St48). When the earphones 1L and 1R acquire the signal indicating that the cumulative usage time t is reset to 0 from the control unit 33 in the processing of step St48, the earphones 1L and 1R reset the cumulative usage time t to 0. When the processing of step St48 ends, the control unit 33 ends the processing according to the flowchart of FIG. 10.

When the control unit 33 acquires the signal indicating that the cleaning of the earphones 1L and 1R is not completed from the display/operation unit 30 (St45, NO), the control unit 33 sets a timer for designating a timing at which the screen displayed in the processing of step St44 is regenerated by processing of the control unit 33 (St46). The time of the timer set here can be set by the user. For example, the time may be 3 hours or 1 day. These are examples and the time is not limited thereto.

The control unit 33 determines whether current time has passed the time set in the processing of step St46 (St47). When the control unit 33 determines in the processing of step St47 that the current time has passed the time set in the processing of step St46 (St47, YES), the processing of the control unit 33 returns to the processing of step St41. When the control unit 33 determines in the processing of step St47 that the current time has not passed the time set in the processing of step St46 (St47, NO), the processing of the control unit 33 returns to the processing of step St47.

In this way, when the control unit 33 detects that the confirmation button indicating that the cleaning of the earphones 1L and 1R is not executed now is pressed by the user, the control unit 33 sets the timer for designating the timing of generating the screen displayed in the processing of step St44.

Figure 11:
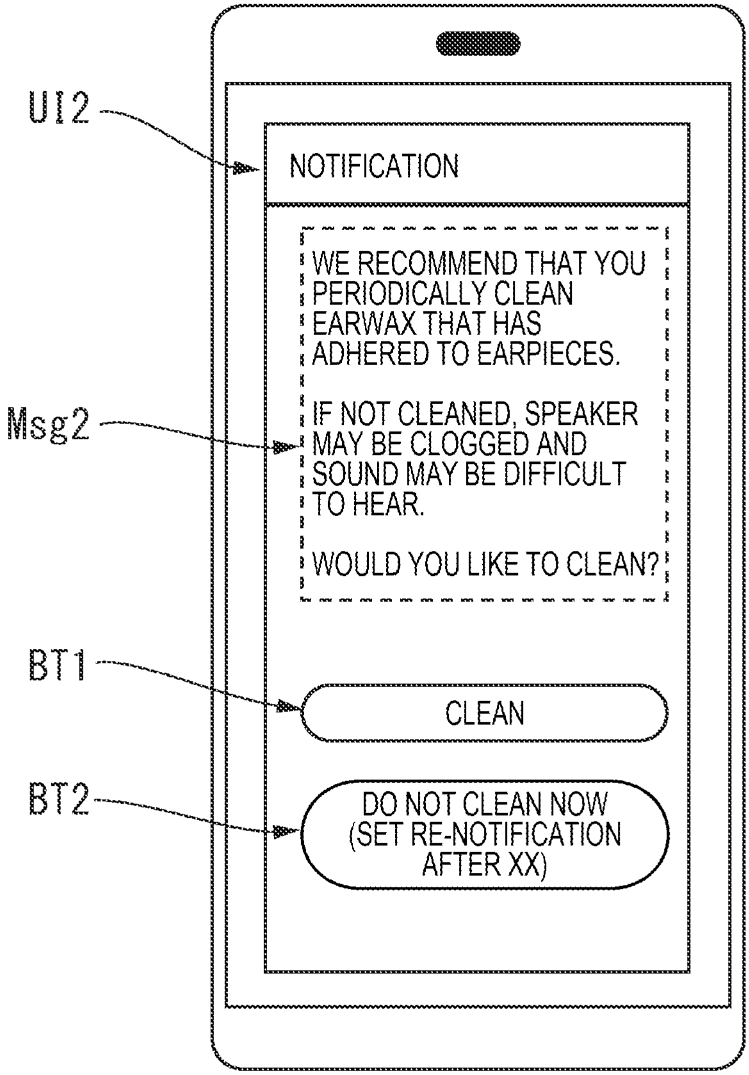
FIG. 11 is a diagram showing an example of a screen for requesting a user to input whether to clean the earphones according to the second embodiment.

Next, an example of a screen for requesting the user to input whether to clean the earphones according to the second embodiment will be described with reference to FIG. 11. FIG. 11 is a diagram showing an example of a screen for requesting the user to input whether to clean the earphones according to the second embodiment.

A screen example UI2 is an example of a screen displayed on the display/operation unit 30. The screen example UI2 includes a message Msg2 and buttons BT1 and BT2. The screen example UI2 is a screen for requesting the user to input whether to clean the earphones 1L and 1R.

The message Msg2 is a message for urging the user to clean the earphones 1L and 1R. The message Msg2 includes, for example, "we recommend that you periodically clean the earwax that has adhered to the earpieces", "if not cleaned, the speakers may be clogged and the sound may be difficult to hear", and "would you like to clean?" These contents of the message Msg2 are examples and are not limited thereto.

When the button BT1 is pressed by the user, the signal indicating that the cleaning of the earphones 1L and 1R is completed is transmitted to the control unit 33. A text displayed on the button BT1 is, for example, "clean". This is an example and the text is not limited thereto.

When the button BT2 is pressed by the user, a signal indicating that the cleaning of the earphones 1L and 1R is not completed and time until the screen example UI2 is displayed again is set is transmitted to the control unit 33. A text displayed on the button BT2 is, for example, "do not clean now (set re-notification after xx)". Here, xx is 3 hours or 1 day. The time until the screen example UI2 is displayed again may be determined in advance or may be set by the user.

In this way, the screen example UI2 is a screen including at least the message Msg2 for urging the user to clean the earphones 1L and 1R, the button BT1 pressed when the user cleans the earphones now, and the button BT2 instructing that the notification for urging the user to clean the earphones 1L and 1R is redisplayed later.

In this way, the measurement system 100 includes the earphones 1L and 1R worn on the left ear and the right ear of the user, respectively, and the smartphone F1 carried by the user. The earphones 1L and 1R measure and accumulate the time during the user uses the earphones 1L and 1R, and transmit the accumulated time to the smartphone F1. The smartphone F1 acquires the accumulated time from the earphones 1L and 1R, determines whether the accumulated time exceeds the predetermined time, and generates a notification for urging the user to clean the earphones when it is determined that the accumulated time exceeds the predetermined time.

Accordingly, the measurement system 100 can support the cleaning of the earphones 1L and 1R, and can prevent a decrease in the sound quality of the earphones 1L and 1R. The earphones 1L and 1R include the speakers SP1L and SP1R capable of playing the music signals. The usage time of the earphones is the time during the music signals are played from the speakers SP1L and SP1R. Accordingly, the measurement system 100 can support the user to clean the earphones 1L and 1R based on time during the user uses the earphones 1L and 1R to play the music.

The earphones 1L and 1R include the speakers SP1L and SP1R capable of playing the music signals and outputting the audio signals during a call. The usage time is the total time of the time during the music signals are played from the speakers SP1L and SP1R and the time during the audio signals are output from the speakers SP1L and SP1R during the call. Accordingly, the measurement system 100 can support the user to clean the earphones 1L and 1R based on the total time during the user uses the earphones 1L and 1R.

The earphones 1L and 1R include the wearing sensors SEL and SER that detect whether the earphones 1L and 1R are worn on the ears of the user, and the usage time is the time during the wearing sensors SEL and SER detect that the earphones 1L and 1R are worn on the ears of the user. Accordingly, the measurement system 100 can support the user to clean the earphones 1L and 1R based on the time during the user wears the earphones 1L and 1R on the ears.

The smartphone F1 repeatedly determines whether the accumulated time exceeds the predetermined time after generating the notification, and generates the notification each time it is determined that the accumulated time exceeds the predetermined time. Accordingly, the measurement system 100 can periodically output a notification for urging the user to clean the earphones 1L and 1R. Accordingly, the measurement system 100 can support a stable output of sound signals with high sound quality from the earphones 1L and 1R.

The smartphone F1 includes the display/operation unit 30, the notification is the screen including the message for urging the user to clean the earphones 1L and 1R, and the smartphone F1 displays the screen on the display/operation unit 30. Accordingly, the measurement system 100 can display the screen including the message for urging the user to clean the earphones 1L and 1R on the display/operation unit 30. Accordingly, the measurement system 100 can support the user to clean the earphones 1L and 1R.

The screen further includes the cleaning execution button pressed when the cleaning of the earphones 1L and 1R is executed. Accordingly, the measurement system 100 can acquire an input related to whether the user cleans the earphones 1L and 1R. Accordingly, even in a case where the user cannot clean the earphones 1L and 1R when the screen for urging the user to clean the earphones 1L and 1R is displayed, the measurement system 100 can display the notification later. Accordingly, the measurement system 100 can support the cleaning of the earphones 1L and 1R with high convenience.

When the earphones 1L and 1R acquire the signal indicating that the press of the cleaning execution button by the user is detected from the smartphone F1, the earphones 1L and 1R set the accumulated time to 0. Accordingly, the measurement system 100 can reset the usage time accumulated by the usage time measuring unit S2La to 0 in accordance with an input operation of the user. Accordingly, the measurement system 100 can perform the notification for urging the user to clean the earphones 1L and 1R at intervals based on the input operation of the user.

The screen further includes the confirmation button indicating that the cleaning of the earphones 1L and 1R is not executed now, and the smartphone F1 sets the timer for designating the timing of generating the notification when the smartphone F1 detects that the confirmation button is pressed by the user. Accordingly, the measurement system 100 can perform the notification for urging the user to clean the earphones 1L and 1R at intervals based on the input operation of the user.

The notification is an audio signal for urging the user to clean the earphones 1L and 1R. Accordingly, the measurement system 100 can perform the notification for urging the user to clean the earphones 1L and 1R by using the audio signal. Accordingly, the measurement system 100 can effectively notify the user of the notification.

Although the embodiments have been described with reference to the accompanying drawings, the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the above embodiments may be optionally combined within a range not departing from the spirit of the invention.

The technique of the present disclosure is useful as a provision of the measurement system and the measurement method that support the cleaning of the earphones and prevent a decrease in sound quality of the earphones.

What is claimed is:

1. A measurement system comprising:
earphones configured to be worn on left and right ears of a user respectively, and the earphones include speakers configured to play music signals; and
a wireless terminal, wherein
the earphones measure and accumulate usage time during which the earphones are used by a user, and transmit accumulated usage time to the wireless terminal,
the wireless terminal acquires the accumulated usage time from the earphones, determines whether the accumulated usage time exceeds predetermined time, and generates a notification for urging the user to clean the earphones when it is determined that the accumulated usage time exceeds the predetermined time, and
the accumulated usage time of the earphones includes time during which the music signals are played from the speakers.

2. The measurement system according to claim 1, wherein
the speakers configured to output audio signals during a call, and
the accumulated usage time of the earphones is total time of the time during which the music signals are played from the speakers and time during which the audio signals are output from the speakers during the call.

3. The measurement system according to claim 1, wherein
the earphones include wearing sensors configured to detect whether the earphones are worn on ears of the user, and
the usage time of the earphones includes time during which the wearing sensors detect that the earphones are worn on the ears of the user.

4. The measurement system, wherein
the wireless terminal includes a display unit,
the notification is a screen including a message for urging the user to clean the earphones, and
the wireless terminal displays the screen on the display unit.

5. The measurement system according to claim 1, wherein the notification is an audio signal for urging the user to clean the earphones.

6. A measurement system, comprising:
earphones configured to be worn on left and right ears of a user respectively; and
a wireless terminal, wherein
the earphones measure and accumulate usage time during which the earphones are used by a user, and transmit accumulated usage time to the wireless terminal,
the wireless terminal acquires the accumulated usage time from the earphones, determines whether the accumulated usage time exceeds predetermined time, and generates a notification for urging the user to clean the earphones when it is determined that the accumulated usage time exceeds the predetermined time, and
the wireless terminal repeatedly determines whether the accumulated usage time exceeds the predetermined time after generating the notification, and generates the notification each time it is determined that the accumulated usage time exceeds the predetermined time.

7. A measurement system, comprising:
earphones configured to be worn on left and right ears of a user respectively; and
a wireless terminal, the wireless terminal includes a display unit, wherein
the earphones measure and accumulate usage time during which the earphones are used by a user, and transmit accumulated usage time to the wireless terminal,
the wireless terminal acquires the accumulated usage time from the earphones, determines whether the accumulated usage time exceeds predetermined time, and generates a notification for urging the user to clean the earphones when it is determined that the accumulated usage time exceeds the predetermined time, the notification is a screen including a message for urging the user to clean the earphones,
the screen further includes a cleaning execution button pressed in a case that a cleaning of the earphones is executed, and
the wireless terminal displays the screen on the display unit.

8. The measurement system according to claim 7, wherein the earphones set the accumulated usage time to zero when the earphones acquire a signal indicating that a press of the cleaning execution button by the user is detected from the wireless terminal.

9. The measurement system according to claim 7, wherein the screen further includes a confirmation button indicating that the cleaning of the earphones is not executed now, and when the wireless terminal detects that the confirmation button is pressed by the user, the wireless terminal sets a timer for designating a timing of generating the notification.

10. A measurement method for controlling earphones worn on left and right ears of a user respectively and a wireless terminal, the method comprising:

by the earphones, measuring and accumulating usage time during which the earphones are used by a user, and transmitting accumulated usage time to the wireless terminal, the earphones include speakers configured to play music signals; and by the wireless terminal, acquiring the accumulated usage time from the earphones, determining whether the accumulated usage time exceeds predetermined time, and generating a notification for urging the user to clean the earphones when it is determined that the accumulated usage time exceeds the predetermined time, and the accumulated usage time of the earphones includes time during which the music signals are played from the speakers.

11. A measurement method for controlling earphones worn on left and right ears of a user respectively and a wireless terminal, the method comprising:

by the earphones, measuring and accumulating usage time during which the earphones are used by a user, and transmitting accumulated usage time to the wireless terminal; and by the wireless terminal, acquiring the accumulated usage time from the earphones, determining whether the accumulated usage time exceeds predetermined time, and generating a notification for urging the user to clean the earphones when it is determined that the accumulated usage time exceeds the predetermined time, and wherein the wireless terminal repeatedly determines whether the accumulated usage time exceeds the predetermined time after generating the notification, and generates the notification each time it is determined that the accumulated usage time exceeds the predetermined time.

* * * * *